United States Patent [19]

Sugimoto et al.

[11] Patent Number: 5,786,295
[45] Date of Patent: Jul. 28, 1998

[54] METHOD FOR PRODUCING METALLIC CATALYST CARRIER

[75] Inventors: Tamotsu Sugimoto, Gunma-ken; Yuji Yoshidomi, Tochigi-ken; Eizoh Suyama, Tokyo, all of Japan

[73] Assignee: Calsonic Co., Ltd., Tokyo, Japan

[21] Appl. No.: 813,164

[22] Filed: Mar. 7, 1997

Related U.S. Application Data

[63] Continuation of Ser. No. 367,679, Dec. 30, 1994, abandoned, which is a continuation of Ser. No. 46,551, Apr. 13, 1993, abandoned.

[30] Foreign Application Priority Data

Nov. 6, 1992 [JP] Japan ................................ 4-297033

[51] Int. Cl.$^6$ .................................................. B01J 21/04
[52] U.S. Cl. ........................... 502/439; 502/527; 148/285; 228/173.6; 228/193; 228/221
[58] Field of Search ........................ 502/527, 439, 502/314; 148/285; 72/147; 228/173.6, 193, 221; 422/180; 428/493

[56] References Cited

U.S. PATENT DOCUMENTS

| | | | |
|---|---|---|---|
| 4,300,956 | 11/1981 | Rosenberger et al. | 502/527 X |
| 4,602,001 | 7/1986 | Cyron | 502/439 |
| 4,752,599 | 6/1988 | Nakamura et al. | 502/439 X |
| 4,853,360 | 8/1989 | Hitachi | 502/439 |
| 5,208,206 | 5/1993 | Yasaki et al. | 502/439 X |

FOREIGN PATENT DOCUMENTS

| | | |
|---|---|---|
| 1218636 | 8/1989 | Japan . |
| 1266978 | 10/1989 | Japan . |
| 2139044 | 5/1990 | Japan . |

OTHER PUBLICATIONS

*Patent Abstracts of Japan*, vol. 14, No. 26, p. 161 (Jan. 18, 1990).

Primary Examiner—Michael Lewis
Assistant Examiner—Thomas G. Dunn, Jr.
Attorney, Agent, or Firm—Kalish & Gilster

[57] ABSTRACT

This invention relates to a method for producing a metallic catalyst carrier used for a catalytic convertor for an automobile, for example, and calcines a metallic catalyst carrier element obtained by alternately winding or laminating metallic plates in vacuum, and in integrally combining the connecting parts of the metallic plates by diffused junction, the metallic catalyst carrier element being calcines at 1200° C. or above and a pressure of 1 Pa to 10 Pa, preferably 1.5 Pa to 10 Pa, to obtain a strong metallic catalyst carrier having oxidization resistance.

1 Claim, 10 Drawing Sheets

Calcination pressure and oxidizing velocity

METHOD FOR PRODUCING METALLIC CATALYST CARRIER

This application is a continuation of application Ser. No. 08/367,679 filed Dec. 30, 1994 now abandoned; which is a continuation of application Ser. No. 08/046,551 filed Apr. 13, 1993 now abandoned.

BACKGROUND OF THE INVENTION

1. Field of the Invention

This invention relates to a method for producing a metallic catalyst carrier to be used for a catalytic converter of an automobile, for example.

2. Description of the Related Art

Heretofore, this type of metallic catalyst carrier has been known disclosed in Japanese Patent Application Laid-open No. 266978/1989 and Japanese Patent Application Laid-open No. 139044/1990.

This will be described with reference to FIG. 9 through FIG. 14.

As shown in FIG. 9 or FIG. 10, metallic catalyst carrier element 1 is prepared by alternately winding flat shaped metallic plate 2 consisting of metallic material of Al-containing material and corrugated metallic plate 3.

Height 3a of crest and trough of the waves of the corrugated metallic plate 3 is 0.5 to 3.0 mm, and pitch 3b between crests of the waves is 1.0 to 3.0 mm.

For the metallic catalyst carrier element 1 of FIG. 10, the flat metallic plate 2 has small waves 2a lower than the waves of the corrugated metallic plate 3. These small waves 2a have height 2b of crest and trough of 0.05 to 0.5 mm and pitch 2c between crests of 1.0 to 3.0 mm.

Then, this metallic catalyst carrier element 1 is calcined in a vacuum furnace under conditions of a furnace temperature of 850° to 1200° C., a degree of vacuum of $10^{-2}$ to $10^{-6}$ Torr (1.33 Pa to $1.33 \times 10^{-4}$ Pa), and calcination time of 30 minutes to 8 hours.

This calcination causes diffused junction between metallic layers of the metallic plate 2 and the metallic plate 3 to form integrally combined joint 4.

In this diffused junction, mutual metallic atoms diffuse exceeding the boundary at the metal contacting point, eliminating the boundary. Thus, a junction is completed.

As a condition for the diffused junction, a temperature shall be $T_D \geq 0.7\, T_M$, where $T_D$ represents the lower limit temperature for the diffused junction and $T_M$ a metal melting point (about 1450° C.). The higher the temperature, the better the diffusion. When the boundary has contamination or surface oxide which prevents diffusion, the junction becomes difficult or is not effected.

The metallic catalyst carrier thus structured, as compared with a conventional brazing method, does not need filler metal. Thus, a carrier which is inexpensive and high in strength is prepared with less oxidation degradation by the influence of filler metal.

However, since such a conventional metallic catalyst carrier is produced under the conditions of a high degree of vacuum of $10^{-2}$ to $10^{-6}$ Torr (1.33 Pa to $1.33 \times 10^{-4}$ Pa) and a furnace temperature of 850° to 1200° C., $Al_2O_3$ is not formed on the surface of metallic plates 2 and 3, and metal remains as exposed, so that the improvement of oxidation resistance by the formation of oxide layer possessed by Al-containing material is not expected.

When treated under atmospheric pressure, material is quickly oxidized, producing oxide on the material surface. Thus, junction is hindered.

When oxide is not formed on the entire surface and the diffused junction is partially effected, the metallic catalyst carrier to be obtained by incomplete junction is poor in junction strength.

As a result, as shown in FIG. 12 and FIG. 13, when a test is conducted by placing the obtained metallic catalyst carrier 5 on pored base 7 and pressing it from the above via flat plate 9 which is little smaller than pore 8 of the pored base 7 using an extrusion strength testing machine. As shown in FIG. 14, there is a problem that leading end portion 6 is protruded, or so-called film out is caused. Therefore, to remedy the above problem, the inventor studied from various points to provide a production method which is capable of having oxidation resistance, and found that such a method can be completed by effecting the calcination under conditions of a low vacuum and a temperature of 1200° C. or above.

SUMMARY OF THE INVENTION

This invention has been completed based on the above knowledge and its object is to provide a method for producing a metallic catalyst carrier having oxidation resistance and being strong.

Claim 1 of this invention, in a method for producing a metallic catalyst carrier by forming a metallic catalyst carrier element by alternately winding or laminating metallic plates, calcining the metallic catalyst carrier element in vacuum for diffused junction, and integrally making junction of the junction part of the metallic plates, calcines the above metallic catalyst carrier element at a temperature of 1200° C. or above under a pressure of 1 Pa to 10 Pa.

In claim 1 of this invention, the pressure of claim 1 is changed to 1.5 Pa to 10 Pa.

In this invention, first, the metallic catalyst carrier element is formed by alternately winding or laminating metallic plates formed of metallic material of Al-containing material.

Then, this metallic catalyst carrier element is heated at 1200° C. or above under a pressure of 1 Pa to 10 Pa.

Thus, Al atom of the material forms coating as $Al_2O_3$ on the surface of Fe, Cr and Al alloy composition particles, and the material constructing atom moves while diffusing mutually at the contacting sections of the metallic plates to effect a diffused junction between the metallic plates.

3

Figure 9:
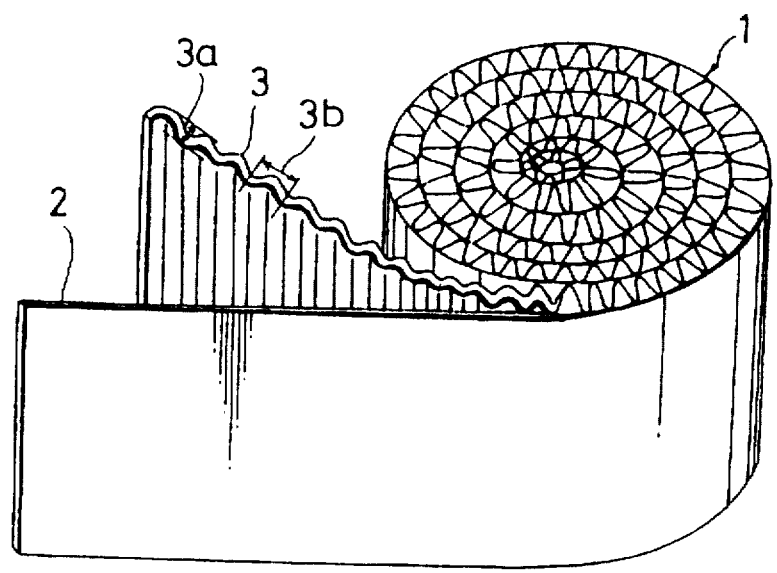

FIG. 9 is a perspective view of the metallic catalyst carrier element.

Figure 10:
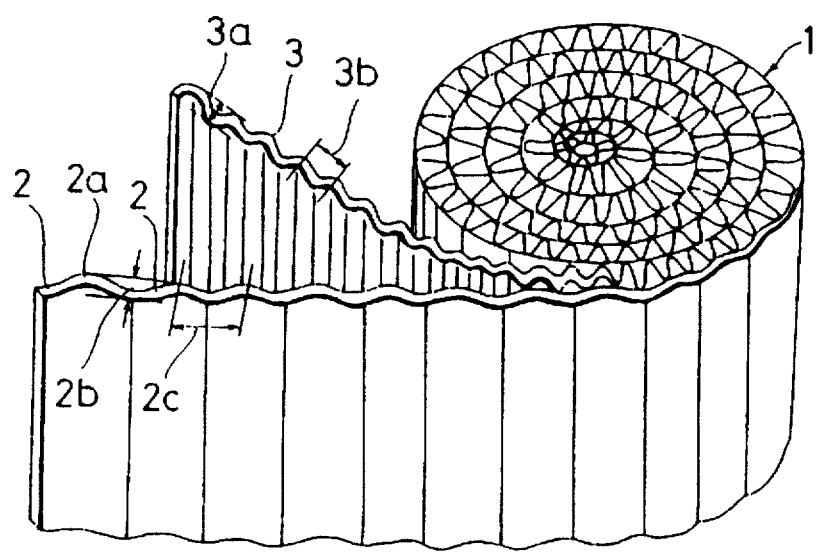

FIG. 10 is a perspective view of the metallic catalyst carrier element.

Figure 11:
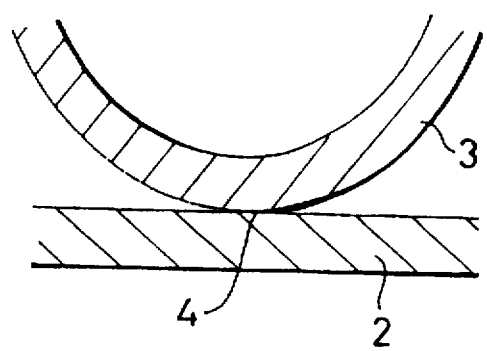

FIG. 11 is a cross section showing a diffused junction part of a conventional metallic catalyst carrier element.

Figure 12:
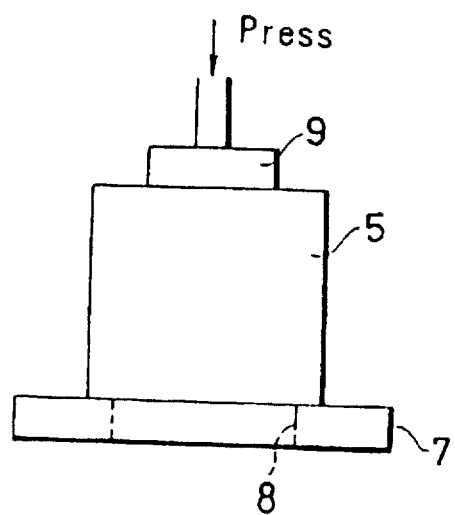

FIG. 12 is an explanatory view showing a measuring method using an extrusion strength testing apparatus of the metallic catalyst carrier element.

Figure 13:
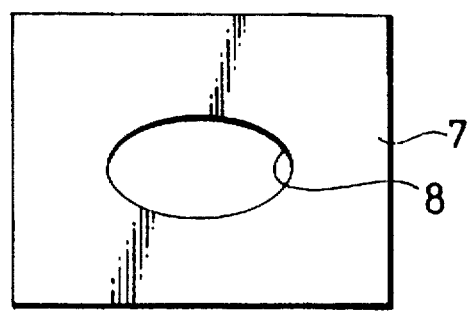

FIG. 13 is a plan view showing the pored base of the extrusion strength testing apparatus of FIG. 12.

Figure 14:
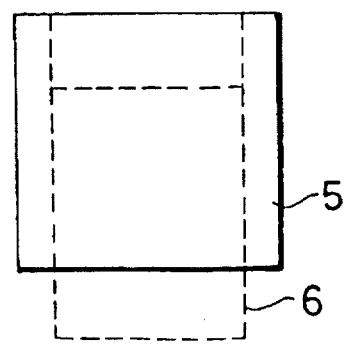

FIG. 14 is an explanatory view showing the film-out of the metallic catalyst carrier element.

PREFERRED EMBODIMENT TO EFFECT THE INVENTION

Examples of this invention will be described below with reference to the drawings.

Figure 1:
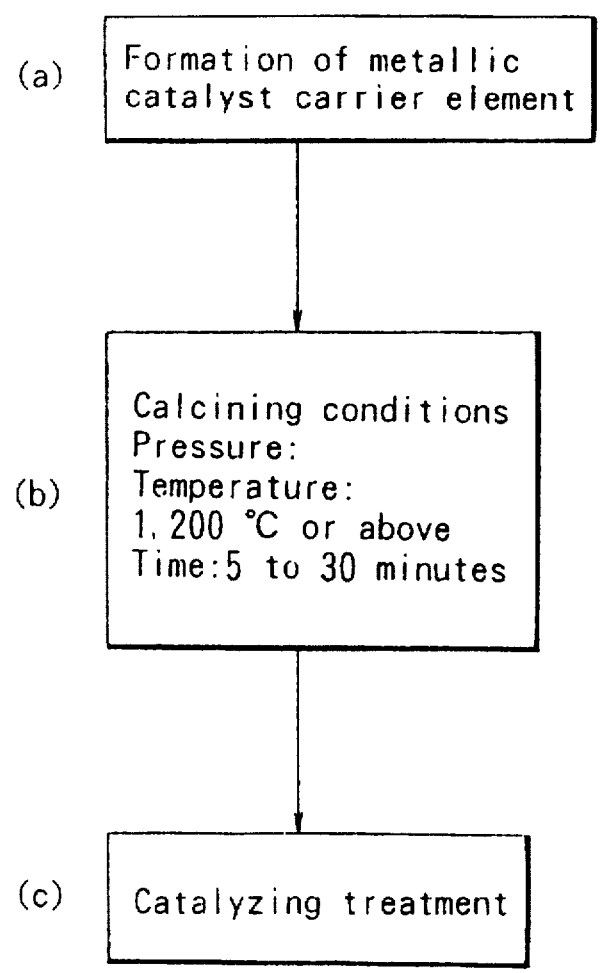
FIG. 1 is a flow chart showing a method for producing a metallic catalyst carrier according to one embodiment of this invention.

FIG. 1 is a flow chart showing a method for producing the metallic catalyst carrier according to one embodiment of this invention.

First, in process (a) of FIG. 1, metallic catalyst carrier element 1 is formed by alternately winding flat-shaped metallic plate 2 and corrugated metallic plate 3. The metallic catalyst carrier element 1 wound is retained in the state contacted by the clamping power at winding with an optional jig.

Here, the metallic plates 2 and 3 used a 50-μm 5Al20Cr-balance of Fe material.

Then, in the process (b) of FIG. 1, the metallic catalyst carrier element 1 was placed in a vacuum furnace and calcined under a pressure of 1 Pa to 10 Pa at 1200° C. or above for 5 to 30 minutes.

In this calcination process, when Al in the material of the metallic plates 2 and 3 exceeds 1200° C., thin $Al_2O_3$ film 10 is formed on the periphery of Fe, Cr and Al alloy composition particles 11, and strong junction 4 formed of solid diffusion layer is formed on the metallic plates 2 and 3.

Then, in process (c) of FIG. 1, the wash coat treatment (catalyzing treatment) was applied to the metallic catalyst carrier element 1 as the catalyzing treatment according to a normal method.

The element condition of the material surface of the metallic catalyst carrier element 1 thus obtained was analyzed by X-ray electronic spectrum analyzer (ESCA of Shimadzu Corporation). The results are shown in FIGS. 2(A and 2(B);

In FIG. 2(A) shows the analyzed surface condition of a material calcined under atmosphere at 1200° C. for 20 minutes and FIG. 2(B) shows the analyzed surface condition of a material calcined in vacuum 1 Pa at 1200° C. for 20 minutes.

Figure 2:
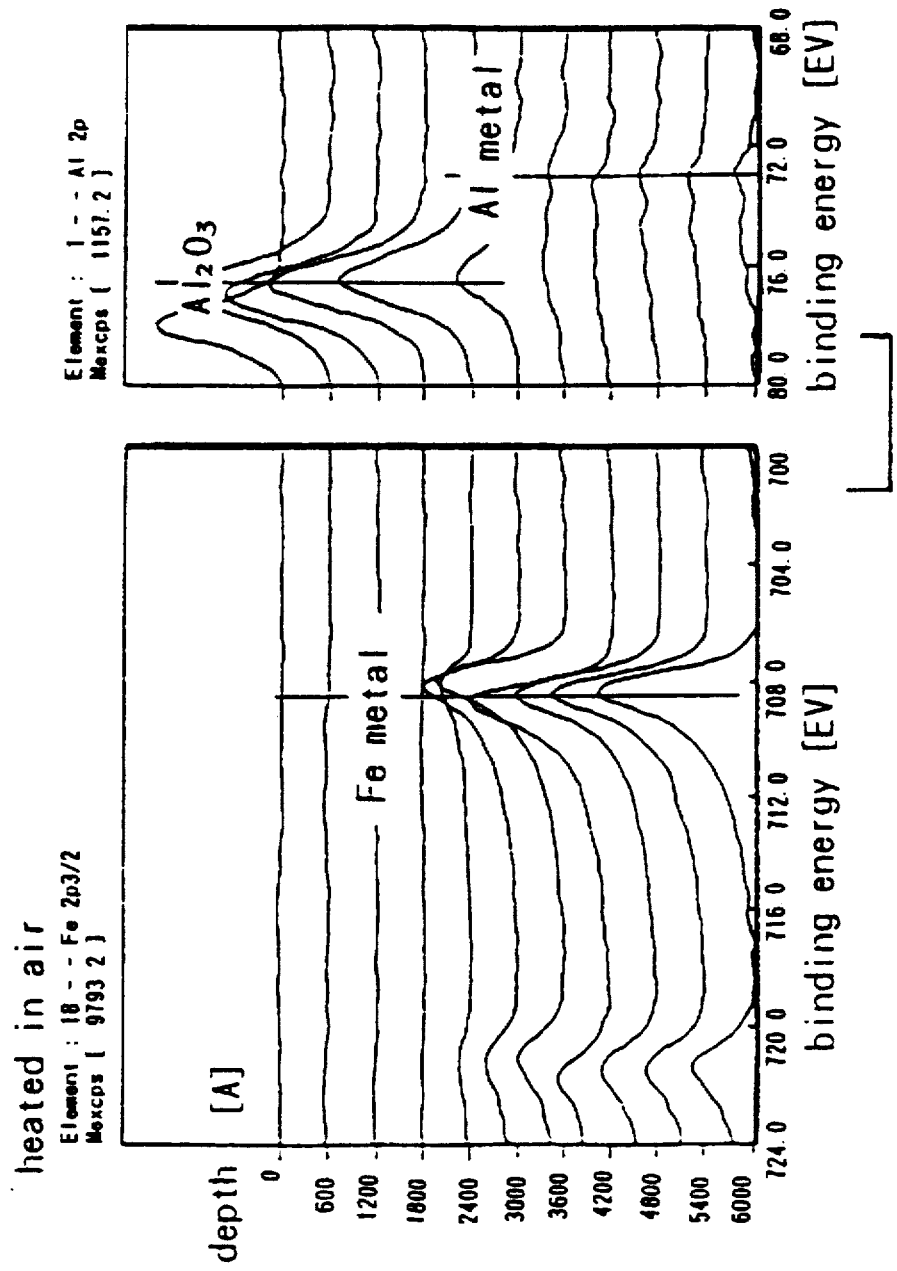
FIGS. 2(A) and 2(B) each shows data obtained by analyzing the material surface of the metallic catalyst carrier element obtained by one embodiment of this invention with X-ray electronic spectrum analyzer.
Figure 2:
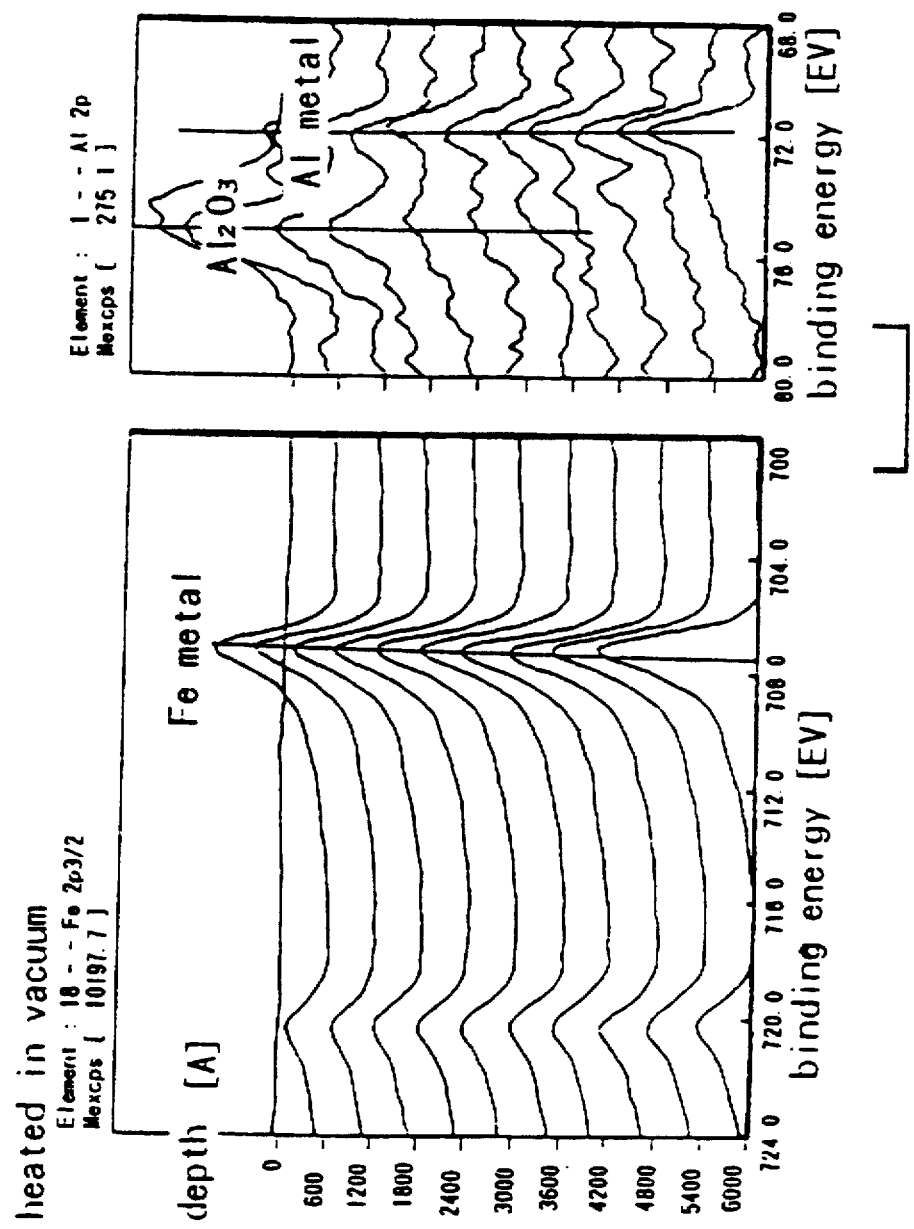

It is seen from Fe and Al of (A) in FIG. 2 that a layer of Al O is formed to the depth of about 1800 A from the surface.

It is seen from Fe and Al of (B) in FIG. 2 that Fe metal and Al metal are exposed on the surface.

Although data of Cr is not shown, Cr metal is also exposed on the surface in the same way as Fe and Al.

Therefore, it is noted that in case of (B) of FIG. 2, metal atom diffuses to move at the time of diffused junction treatment, and junction is securely made mutually.

According to the element state analysis shown in FIG. 2, the metal material after the diffused junction treatment was

Figure 3:
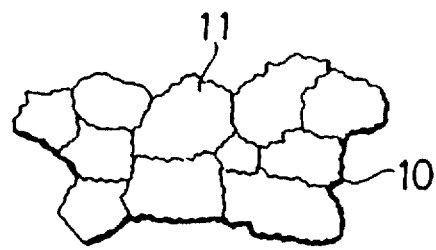
FIG. 3 shows a cross section of the main part of the metallic catalyst carrier element obtained by one embodiment of this invention.

4 confirmed that thin $Al_2O_3$ film 10 was formed on the periphery of Fe, Cr and Al alloy composition particles 11 in the material as shown in FIG. 3.

In view of the above, the diffused junction of metal is surely effected, and by the thin $Al_2O_3$ film 10 formed on the periphery of Fe, Cr and Al alloy composition particles 11 in the material, possibility of Fe, Cr and Al alloy composition particles in the material to be directly exposed to oxygen is decreased, capable of improving oxidation resistance.

This oxidation resistance will be described below in detail.

Figure 4:
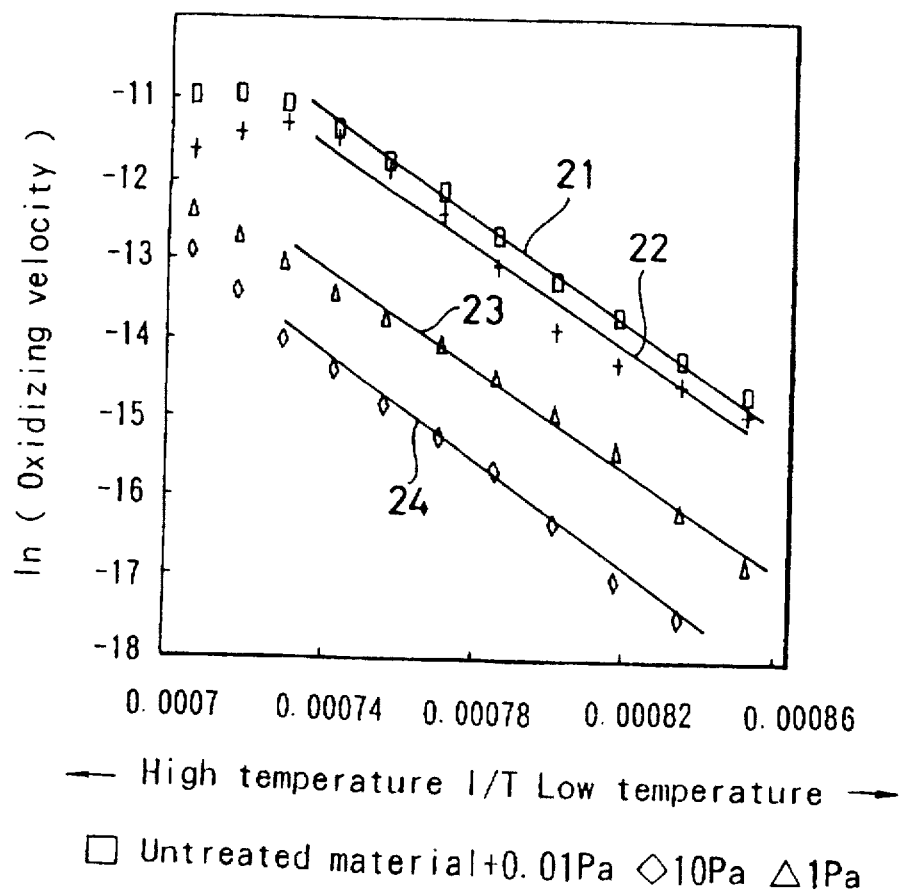
FIG. 4 is a graph showing the relation between calcination pressure and oxidizing velocity.
Figure 5:
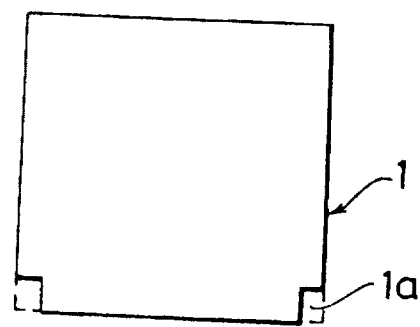
FIG. 5 is a side view showing buckling of the metallic catalyst carrier element.

FIG. 4 shows the relation between calcination pressure and oxidizing velocity. In the drawing, reference numeral 21 is an untreated material not having undergone the vacuum heat treatment, and 22, 23 and 24 represent differences of oxidizing velocity of each material when calcined under calcination pressure of 0.01 Pa, 1 Pa and 10 Pa respectively.

According to FIG. 4, it is seen that the material calcined at 1 Pa or above has an oxidizing velocity of 1/several numbers of that of the untreated material. Here, decrease of the oxidizing velocity means improvement of oxidization resistance. The oxidizing velocity of the material thermally treated in high vacuum is the same with that of the untreated material, and the oxidization resistance is very poor as compared with the treating method under a low vacuum.

The metallic catalyst carrier thus obtained was subjected to the extrusion test by using the extrusion strength test equipment shown in FIG. 12.

As a result, the lower end part 1a of the metallic catalyst carrier was buckled and film out did not take place.

This buckling will be described in detail.

Figure 6:
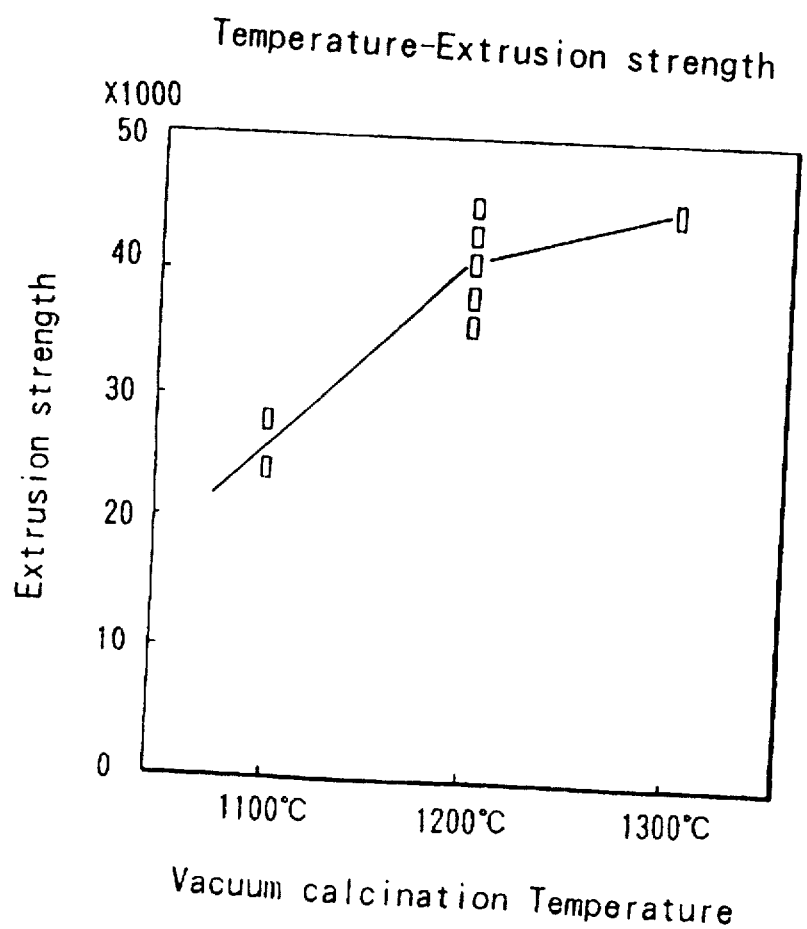
FIG. 6 is a graph showing the relation between calcination temperature and extrusion strength.

FIG. 6 shows the relation between the calcination temperature and the extrusion strength.

As clear from FIG. 6, at less than 1200° C., the extrusion strength is less than 40,000N, causing film-out in the same manner as a conventional metallic catalyst carrier.

However, when the calcination temperature exceeds 1200° C., the extrusion strength exceeds 40,000N, and as described above, the lower end part 1a of the metallic catalyst carrier was buckled and the film-out wad not caused.

As clear from FIG. 6, it is seen that diffusion is accelerated and junction becomes strong as the calcination temperature increases.

As described above, it was confirmed that the metallic catalyst carrier causes the film-out when the extrusion strength is less than 40,000N, and that the metallic catalyst carrier 1 is buckled when the extrusion strength is 40,000N or above.

Figure 7:
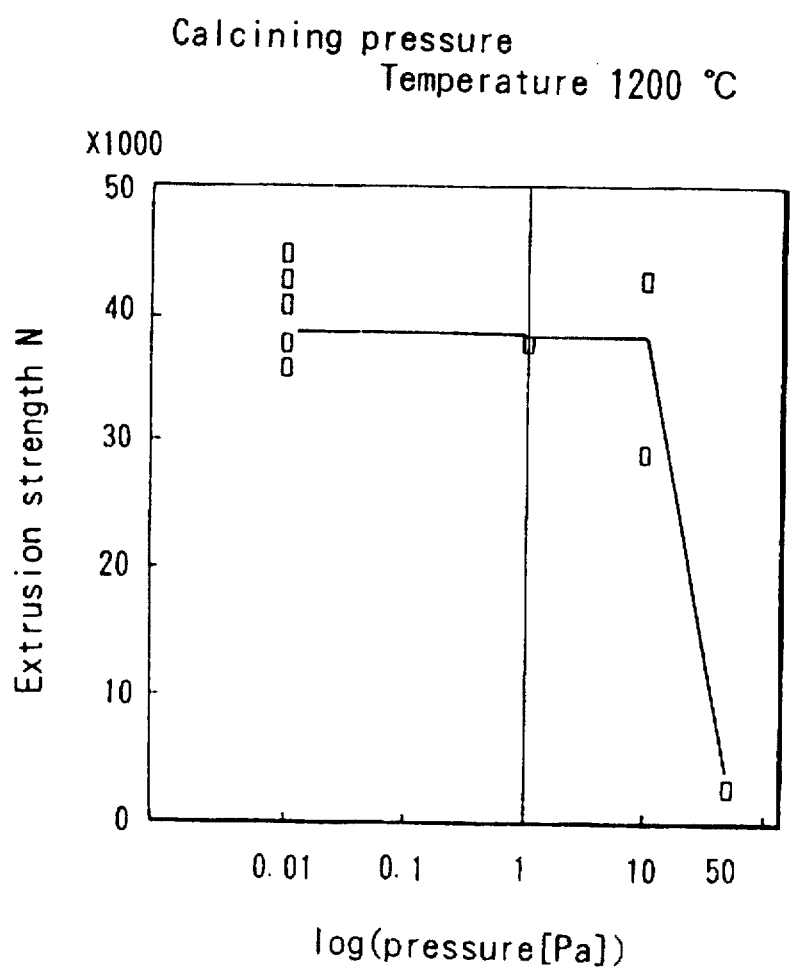
FIG. 7 is a graph showing the relation between calcination pressure and extrusion strength at a calcination temperature of 1200° C.

When the calcination temperature is 1200° C., for the relation of the calcination pressure and the extrusion strength, the extrusion strength shows 40,000N in the treatment under a low pressure of less than 10 Pa as shown in FIG. 7, and the extrusion strength sharply lowers to below 4,000N in the treatment under a high pressure of above 10 Pa.

From the above, it was confirmed that buckling occurs under a low pressure of less than 10 Pa and film out occurs under a pressure higher than 10 Pa.

Therefore, the processing under a low pressure of less than 10 Pa is suitable for diffused junction, and when the extrusion strength test is effected, all the lower end part 1a of the metallic catalyst carrier is buckled.

Further, as to the calcination pressure, it was confirmed by ESCA that when it is 1 Pa or below, oxide layer is not formed on the surface of the calcined material, or on the surface of the composition particles. This oxide layer on the surface is a main cause of oxidization resistance of the material.

Therefore, it is understood that in view of oxidization resistance, the calcination pressure is desired to be 1 Pa to 10 Pa.

And, as to the calcination time, strong metallic catalyst carrier 1 having the above oxidization resistance can be obtained in 5 to 30 minutes. In less than 5 minutes, reaction of coating the periphery of Fe, Cr and Al alloy composition particles in the material with $Al_2O_3$ cannot be completed, and when it exceeds 30 minutes, the material is possibly deteriorated.

As described above, according to this embodiment, after forming the metallic catalyst carrier element 1 by alternately winding the metallic plates 2 and 3, this metallic catalyst carrier element 1 is calcined under a pressure of 1 Pa to 10 Pa at 1200° C. or above, and Al in the material forming the metallic plates 2 and 3 becomes $Al_2O$ to coat the surface of the Fe, Cr and Al alloy composition particles 11 in the material to form a film 10 which hardly allows oxygen to pass through. And, metallic atom is exposed at the boundary of the metallic plates 2 and 3 not to prevent atoms from diffusing, so that the junction part 4 can be securely connected.

Then, the pressure at the calcination in the above example is determined to 1 Pa and 1.5 Pa to experiment the oxidation resistance of the material forming the metallic catalyst carrier.

The calcination temperature was 1210° C. and calcination time was 20 minutes.

Figure 8:
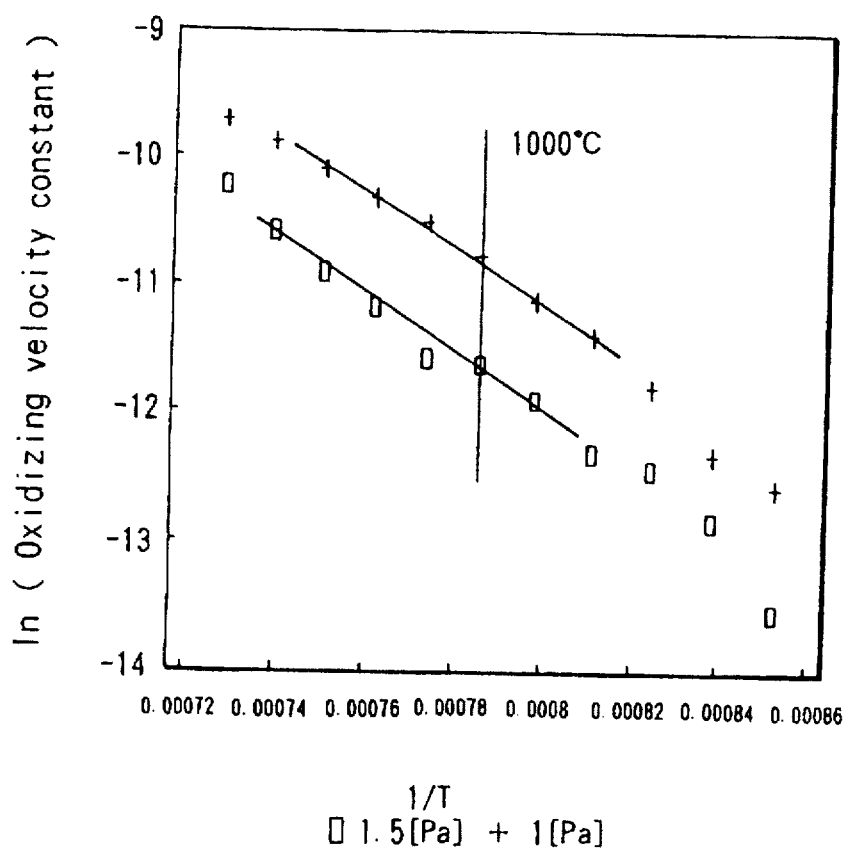
FIG. 8 is a graph showing the relation between calcination degree of vacuum and oxidizing velocity constant.

The results are shown in FIG. 8.

Here, the oxidizing velocity of the material forming the metallic catalyst carrier was $1.98 \times 10^{-5}$ (mg/cm$^2$)$^2$ /min at 1000° C. and 1 Pa, and $9.0 \times 10^{-6}$ (mg/cm$^2$)$^2$ /min at 1000° C. and 1.5 Pa.

The maximum limit oxidization gain of Al of 50 um 5Al20Cr-balance Fe material is 0.8 mg/cm$^2$, so it is expressed as $t=P^2/2k$, where t is a time before the complete consumption of Al, P oxidization gain, and k oxidizing velocity constant.

Therefore, at 1 Pa, $t=(0.8)^2/(2 \times 1.98 \times 10^{-5})=16162$ minutes=269 hours, and at 1.5 Pa, $t=(0.8)^2/(2 \times 9.0 \times 10^{-6})= 35555$ minutes=593 hours.

As a result, the material calcined at 1.5 Pa resists oxidation for a duration of 2 times of that of 1 Pa.

From the above result, it was confirmed that to obtain a metallic catalyst carrier with high safety, it is desirable to make the pressure for calcination to 1.5 Pa or above.

In the above example, the metallic catalyst carrier element 1 was formed by alternately winding the metallic plates 2 and 3, but it may be formed by alternately laminating the metallic plates 2 and 3.

In the above example, the flat metallic plate 2 and the corrugated metallic plate 3 were used for description, but the flat metallic plate 2 may be provided with small wave 2a as shown in FIG. 10.

Further, the material usable in this invention is optional as far as it is generally used for a metallic catalyst carrier. For example, they are 10 to 40 wt % of Cr, 1 to 7 wt % of Al and the balance of Fe; 10 to 40 wt % of Cr, 0.1 to 1 wt % of La, 0 to 1 wt % of Ce, 2.5 wt % of Al and the balance of Fe; 3.5 to 10 wt % of Cr, 1 to 7 wt % of Al, 1.5 wt % of Nb, 0.15 wt % of Zr, 0.1 to 1 wt % of La and the balance of Fe; and 10 to 15 wt % of Cr, 3 to 5.5 wt % of Al, 1 wt % of Mo, 0.1 to 5 wt % of La, 0.01 to 1 wt % of Ce and the balance of Fe.

Possibility of Industrial Utilization

As described above, according to this invention, as the metallic catalyst carrier element is calcined under a low pressure of 1 Pa to 10 Pa, preferably 1.5 Pa to 10 Pa, and at a high temperature of 1200° C. or above, Al in the material of the metallic plate becomes $Al_2O_3$, and forms a film which hardly allows oxygen to pass through on the surface of the Fe, Cr and Al alloy composition particles in the material to improve oxidation resistance, and also the strength of the diffused junction part of the metallic plates becomes strong to prevent the film-out.

What is claimed is:

1. A method for producing a metallic catalyst carrier comprising (a) forming a metallic catalyst carrier element by alternately winding or laminating first and second metallic plates made of an alloy containing Fe, Cr, and Al, (b) calcining the metallic catalyst carrier element in a vacuum, and (c) integrally connecting a junction part of the first metallic plate and the second metallic plate by a diffused junction, wherein the metallic catalyst carrier element is calcined above a temperature of 1200° C. under a pressure in the range of 1.5 Pa to 10 Pa and for a time between 5 and 30 minutes to produce on the surface of the metallic catalyst carrier element an effective protective aluminum oxide film.

* * * * *